(12) United States Patent
Li et al.

(10) Patent No.: US 10,958,114 B2
(45) Date of Patent: Mar. 23, 2021

(54) METHOD OF MAKING A MAGNETIC CORE WITH TOOTH HAVING OVERLAPPING SHORT AND LONG TEETH DISTAL ENDS

(71) Applicant: Johnson Electric International AG, Murten (CH)

(72) Inventors: Yue Li, Hong Kong (CN); Mao Xiong Jiang, Shenzhen (CN); Jian Zhao, Shenzhen (CN); Yong Wang, Shenzhen (CN); Yong Li, Shenzhen (CN); Yan Fei Liao, Shenzhen (CN); Ying Song Ye, Shenzhen (CN); Hai Jun Hua, Shenzhen (CN)

(73) Assignee: Johnson Electric International AG, Murten (CH)

( * ) Notice: Subject to any disclaimer, the term of this patent is extended or adjusted under 35 U.S.C. 154(b) by 0 days.

(21) Appl. No.: 16/589,573

(22) Filed: Oct. 1, 2019

(65) Prior Publication Data
US 2020/0052532 A1    Feb. 13, 2020

Related U.S. Application Data

(63) Continuation of application No. 15/167,664, filed on May 27, 2016, now Pat. No. 10,476,321.

(30) Foreign Application Priority Data

May 27, 2015  (CN) .......................... 201510280698.1
Feb. 3, 2016   (CN) .......................... 201610078383.3

(51) Int. Cl.
*H02K 1/14*    (2006.01)
*H02K 15/02*   (2006.01)

(52) U.S. Cl.
CPC ........... *H02K 1/146* (2013.01); *H02K 15/022* (2013.01); *H02K 15/026* (2013.01); *H02K 2213/03* (2013.01); *Y02P 80/30* (2015.11)

(58) Field of Classification Search
CPC ............ H02K 1/14; H02K 1/146; H02K 1/16; H02K 1/08; H02K 1/06; H02K 15/02;
(Continued)

(56) References Cited

U.S. PATENT DOCUMENTS

| 1,538,196 A | * | 5/1925 | Livingston | ............... | H02K 1/16 |
| | | | | | 310/216.102 |
| 4,616,151 A | * | 10/1986 | Pryjmak | ................... | H02K 1/26 |
| | | | | | 310/216.012 |

(Continued)

FOREIGN PATENT DOCUMENTS

| JP | 54022107 U | 2/1979 |
| JP | 11-069668 | 3/1999 |
| JP | 3544857 B2 | 7/2004 |

OTHER PUBLICATIONS

Lim et al., "Design and iron loss analysis of sensorless-controlled interior permanent magnet synchronous motors with concentrated winding," IET Electric Power Applications, vol. 8, Iss. 9, 2014, pp. 349-356, 8 pages.

*Primary Examiner* — Maged M Almawri
(74) *Attorney, Agent, or Firm* — Muncy, Geissler, Olds and Lowe, P.C.

(57) ABSTRACT

A magnetic core for an electric motor has a ring-shaped yoke, teeth extending outwardly from the yoke, and a tooth tip extending from a distal end of each tooth. The core is formed from curved or coils strip laminations having teeth arranged in tooth groups. Each group has four tooth types arranged sequentially. Each tooth has left and right half tooth tips. The length of the half tooth tips vary according to tooth type. When assembled, first type tooth overlap with third type teeth and second type teeth overlap with fourth type teeth, whereby the opening of the winding slot is narrowed compared to laminations having all identical teeth.

10 Claims, 6 Drawing Sheets

(58) Field of Classification Search
CPC . H02K 15/022; H02K 15/026; H02K 2201/09
USPC ..... 310/216.011–216.019, 216.059, 216.061,
310/216.062, 216.064, 216.065, 216.071,
310/216.073, 216.092, 216.096,
310/216.004–216.097; 29/596, 597
See application file for complete search history.

(56) References Cited

U.S. PATENT DOCUMENTS

| | | | | |
|---|---|---|---|---|
| 4,700,098 | A * | 10/1987 | Kawashima | H02K 29/08 310/156.45 |
| 4,847,526 | A * | 7/1989 | Takehara | H02K 1/146 310/185 |
| 5,107,159 | A * | 4/1992 | Kordik | H02K 1/146 310/156.44 |
| 5,331,245 | A * | 7/1994 | Burgbacher | H02K 29/03 310/186 |
| 5,477,096 | A * | 12/1995 | Sakashita | H02K 1/06 310/216.016 |
| 5,778,703 | A * | 7/1998 | Imai | D06F 37/40 68/12.02 |
| 5,986,377 | A * | 11/1999 | Yamada | H02K 1/148 310/216.013 |
| 6,242,835 | B1 * | 6/2001 | Uemura | H02K 3/493 310/214 |
| 6,424,073 | B1 * | 7/2002 | Kometani | H02K 1/16 310/179 |
| 6,433,456 | B1 * | 8/2002 | Higashino | H02K 1/16 310/180 |
| 6,774,520 | B2 * | 8/2004 | Wauke | G11B 19/2009 310/156.45 |
| 6,885,127 | B1 * | 4/2005 | Higashino | H02K 1/16 310/179 |
| 6,919,663 | B2 * | 7/2005 | Iles-Klumpner | H02K 1/276 310/156.01 |
| 8,274,182 | B2 * | 9/2012 | Nakayama | H02K 41/03 310/12.25 |
| 8,847,460 | B2 * | 9/2014 | Jurkovic | H02K 21/16 310/216.092 |
| 9,331,530 | B2 * | 5/2016 | Jang | H02K 1/146 |
| 9,685,264 | B2 * | 6/2017 | Neuenschwander | H02K 15/02 |
| 2002/0075121 | A1 * | 6/2002 | Akita | H02K 1/148 336/234 |
| 2007/0018529 | A1 * | 1/2007 | Naitou | H02K 1/148 310/216.012 |
| 2011/0169369 | A1 * | 7/2011 | Liang | H02K 29/03 310/216.092 |
| 2014/0209728 | A1 | 7/2014 | Neuenschwander et al. | |

* cited by examiner

METHOD OF MAKING A MAGNETIC CORE WITH TOOTH HAVING OVERLAPPING SHORT AND LONG TEETH DISTAL ENDS

CROSS REFERENCE TO RELATED APPLICATIONS

This non-provisional patent application is a continuation of U.S. patent application Ser. No. 15/167,664, filed 27 May 2016, which claims priority under 35 U.S.C. § 119(a) from Patent Application No. 201510280698.1 filed in The People's Republic of China on May 27, 2015, and from Patent Application No. 201610078383.3 filed in The People's Republic of China on Feb. 3, 2016, the entire contents of both are hereby incorporated by reference.

FIELD OF THE INVENTION

This invention relates to an electric motor and in particular, to a magnetic core of the electric motor.

BACKGROUND OF THE INVENTION

A conventional magnetic core for a motor includes a ring-shaped yoke and a plurality of teeth extending outwardly from the yoke. Each tooth has a tooth tip at a distal end thereof. Each tooth tip has a left half tooth tip and a right half tooth tip. The length of the left and right half tooth tips are measured in the circumferential direction of the yoke and are equal.

The magnetic core is made by stacking a plurality of ring-shaped core laminations. If the core laminations are directly punched from sheet materials, a large amount of waste material will be produced.

In an improved solution, an elongated core lamination is punched from a rectangular sheet material, which elongated core lamination includes a connection portion and a plurality of teeth extending from the connecting portion. The connecting portion is bent to form a ring-shaped core lamination. A disadvantage of this method is that the length of the tooth tip is limited, which results in an unduly large opening of the winding slot of the magnetic core.

SUMMARY OF THE INVENTION

Hence there is a desire for a magnetic core which has relatively low material wastage and narrow winding slot openings.

Accordingly, in one aspect thereof, the present invention provides a magnetic core for an electric motor, comprising: a ring-shaped yoke; teeth extending outwardly from the yoke, and a tooth tip extending from a distal end of each tooth in a circumferential direction of the core, each tooth tip having a left half tooth tip and a right half tooth tip; wherein the magnetic core has a plurality of lamination layers, each lamination layer comprising: multiple teeth having a first type tooth, a second type tooth, a third type tooth and a fourth type tooth, the left half tooth tip of the first type tooth being a short tooth tip, the right half tooth tip of the first type tooth being a long tooth tip, the left and right half tooth tips of the second type tooth being both short tooth tips, the left half tooth tip of the third type tooth being a long tooth tip, the right half tooth tip of the third type tooth being a short tooth tip, the left and right half tooth tips of the fourth type tooth being both long tooth tips; and wherein, in an axial direction of the motor, the first type tooth of at least one lamination layer overlaps with the third type tooth of another lamination layer, the second type tooth of the at least one lamination layer overlaps with the fourth type tooth of the another lamination layer, the third type tooth of the at least one lamination layer overlaps with the first type tooth of the another lamination layer, and the fourth type tooth of the at least one lamination layer overlaps with the second type tooth of the another lamination layer.

Preferably, each lamination layer includes an even number of teeth; the magnetic core is formed by stacking multiple layers of first core laminations and multiple layers of second core laminations and, in the motor axial direction, the first type tooth, second type tooth, the third type tooth and fourth type tooth of the first core lamination overlap with the third type tooth, fourth type tooth, first type tooth, and second type tooth of the second core lamination, respectively.

Preferably, the first type tooth, second type tooth, the third type tooth and fourth type tooth form one tooth group, the magnetic core includes two types of lamination layers, a first type of core lamination is formed by cutting off a first half of a first tooth group from a core lamination having sequentially arranged k+1 tooth groups, and a second type of core lamination is formed by cutting off a second half of a last tooth group from a core lamination having sequentially arranged k+1 tooth groups, where k is an integer greater than zero; the first type of core lamination and the second type of core lamination are alternately arranged.

Preferably, wherein each tooth group satisfies one of the following conditions: (a) each tooth group includes multiple first type teeth, one second type tooth, multiple third type teeth, and one fourth type tooth that are sequentially arranged, wherein the number of the first type teeth is the same as the number of the third type teeth; (b) each tooth group includes one second type tooth, multiple third type teeth, one fourth type tooth, and multiple first type teeth that are sequentially arranged, wherein the number of the first type teeth is the same as the number of the third type teeth; (c) each tooth group includes multiple third type teeth, one fourth type tooth, multiple first type teeth, and one second type tooth that are sequentially arranged, wherein the number of the first type teeth is the same as the number of the third type teeth; (d) each tooth group includes one fourth type tooth, multiple first type teeth, one second type tooth, and multiple third type teeth that are sequentially arranged, wherein the number of the first type teeth is the same as the number of the third type teeth.

Preferably, each lamination layer has S teeth, wherein multiple first type teeth, one second type tooth, multiple third type teeth and one fourth type tooth are sequentially arranged to form one tooth group, the number of the third type teeth is the same as the number of the first type teeth in each tooth group, and each tooth group has T teeth, with S and T satisfying the following relation: $S/T=N+\frac{1}{2}$, where N is a positive integer and T is an even number.

Preferably, a sum of the length of the right half tooth tip of the first type tooth and the length of the left half tooth tip of the second type tooth, a sum of the length of the right half tooth tip of the second type tooth and the length of the left half tooth tip of the third type tooth, a sum of the length of the right half tooth tip of the third type tooth and the length of the left half tooth tip of the fourth type tooth tip, and a sum of the length of the right half tooth tip of the fourth type tooth and the length of the left half tooth tip of the first type tooth tip are substantially the same.

Preferably, the magnetic core is made by spirally rolling an elongated sheet material multiple turns, with each turn forming one lamination layer of the magnetic core.

Preferably, each lamination layer of the magnetic core is made by bending an individual sheet material.

According to a second aspect, the present invention provides a method for making a magnetic core for an electric motor, comprising the following steps: step S1: forming a plurality of elongated sheet materials by punching, with each sheet material including a connecting portion and a plurality of teeth extending from the connecting portion, each tooth including a tooth tip extending from a distal end of the tooth to two sides thereof, the tooth tip including a left half tooth tip and a right half tooth tip; each sheet material including a plurality of groups each having a first type tooth, a second type tooth, a third type tooth and a fourth type tooth that are sequentially arranged, the left half tooth tip of the first type tooth being a short tooth tip, the right half tooth tip of the first type tooth being a long tooth tip, the left and right half tooth tips of the second type tooth are both short tooth tips, the left half tooth tip of the third type tooth being a long tooth tip, the right half tooth tip of the third type tooth being a short tooth tip, the left and right half tooth tips of the fourth type tooth being both long tooth tips; step S3: bending each sheet material into a ring-shaped core lamination, with the connecting portions of all sheet materials making a ring-shaped yoke and the teeth of each sheet material extending outwardly from the yoke; and step S4: stacking multiple layers of ring-shaped core laminations, with the first type tooth of at least one lamination layer overlapping with the third type tooth of another lamination layer, the second type tooth of the at least one lamination layer overlapping with the fourth type tooth of the another lamination layer, the third type tooth of the at least one lamination layer overlapping with the first type tooth of the another lamination layer, and the fourth type tooth of the at least one lamination layer overlapping with the second type tooth of the another lamination layer.

Preferably, at step S1, each lamination layer after being punched has S teeth, wherein multiple first type teeth, one second type tooth, multiple third type teeth and one fourth type tooth that are sequentially arranged to form one tooth group, and each tooth group has T teeth, with S and T satisfying the following relation: $S/T=N+½$, where N is a positive integer and T is an even number; and at step S3, the first type tooth, second type tooth, third type tooth and fourth type tooth of a first type sheet material overlap with the third type tooth, fourth type tooth, first type tooth and second type tooth of a second type sheet material, respectively.

Preferably, at step S3, the first type sheet material and the second type sheet material are alternately arranged.

Preferably, at step S1, the sheet material is first punched to have 2k+1 tooth groups, and the sheet material having 2k+1 tooth groups is cut at the (k+1)th tooth group, thus obtaining the first type sheet material and the second type sheet material.

Preferably, at step S1, each tooth group satisfies one of the following conditions: (a) each tooth group includes multiple first type teeth, one second type tooth, multiple third type teeth, and one fourth type tooth that are sequentially arranged, wherein the number of the first type teeth is the same as the number of the third type teeth; (b) each tooth group includes one second type tooth, multiple third type teeth, one fourth type tooth, and multiple first type teeth that are sequentially arranged, wherein the number of the first type teeth is the same as the number of the third type teeth; (c) each tooth group includes multiple third type teeth, one fourth type tooth, multiple first type teeth, and one second type tooth that are sequentially arranged, wherein the number of the first type teeth is the same as the number of the third type teeth; (d) each tooth group includes one fourth type tooth, multiple first type teeth, one second type tooth, and multiple third type teeth that are sequentially arranged, wherein the number of the first type teeth is the same as the number of the third type teeth.

According to a third aspect, the present invention provides a method for making a magnetic core for an electric motor, comprising the following steps: step S1: forming a plurality of elongated sheet materials by punching, with each sheet material including a connecting portion and a plurality of teeth extending from the connecting portion, each tooth including a tooth tip extending from a distal end of the tooth to two sides thereof, the tooth tip including a left half tooth tip and a right half tooth tip; each sheet material including a plurality of groups of teeth each having a first type tooth, a second type tooth, a third type tooth and a fourth type tooth that are sequentially arranged, the left half tooth tip of the first type tooth being a short tooth tip, the right half tooth tip of the first type tooth being a long tooth tip, the left and right half tooth tips of the second type tooth are both short tooth tips, the left half tooth tip of the third type tooth being a long tooth tip, the right half tooth tip of the third type tooth being a short tooth tip, the left and right half tooth tips of the fourth type tooth being both long tooth tips; step S2: stacking multiple sheet materials to form multiple layers of core laminations, with the first type tooth of at least one lamination layer overlapping with the third type tooth of another lamination layer, the second type tooth of the at least one lamination layer overlapping with the fourth type tooth of the another lamination layer, the third type tooth of the at least one lamination layer overlapping with the first type tooth of the another lamination layer, and the fourth type tooth of the at least one lamination layer overlapping with the second type tooth of the another lamination layer; and step S3: bending the stacked multiple layers of core laminations into a ring shape, with the connecting portions of all sheet materials making a ring-shaped yoke, and the teeth of each sheet material extending outwardly from the yoke.

According to a another aspect, the present invention provides a method for making a magnetic core for an electric motor, comprising the following steps: step S1: forming an elongated sheet material by punching, with the sheet material including a connecting portion and a plurality of teeth extending from the connecting portion, each tooth including a tooth tip extending from a distal end of the tooth to two sides thereof, the tooth tip including a left half tooth tip and a right half tooth tip; the sheet material including a plurality of groups of teeth each having a first type tooth, a second type tooth, a third type tooth and a fourth type tooth that are sequentially arranged, the left half tooth tip of the first type tooth being a short tooth tip, the right half tooth tip of the first type tooth being a long tooth tip, the left and right half tooth tips of the second type tooth are both short tooth tips, the left half tooth tip of the third type tooth being a long tooth tip, the right half tooth tip of the third type tooth being a short tooth tip, the left and right half tooth tips of the fourth type tooth being both long tooth tips; and step S2: spirally rolling the sheet material multiple turns, with each turn forming a lamination layer of the magnetic core, each lamination layer including a ring-shaped yoke and the teeth extending from the yoke; with the first type tooth of at least one lamination layer overlapping with the third type tooth of another lamination layer, the second type tooth of the at least one lamination layer overlapping with the fourth type tooth of the another lamination layer, the third type tooth of the at least one lamination layer overlapping with the first type tooth of the another lamination layer, and the fourth type tooth of the at least one lamination layer overlapping with the second type tooth of the another lamination layer.

Preferably, at step S2, each lamination layer has S teeth, wherein the first type tooth, second type tooth, third type tooth and fourth type tooth form one tooth group, and each tooth group has T teeth, with S and T satisfying the following relationship: S/T=N+½, where N is a positive integer and T is an even number; the last T/2 teeth of a previous lamination layer and the first T/2 teeth of a later lamination layer form one tooth group.

Preferably, at step S2, each tooth group satisfies one of the following conditions: (a) each tooth group includes multiple first type teeth, one second type tooth, multiple third type teeth, and one fourth type tooth that are sequentially arranged; (b) each tooth group includes one second type tooth, multiple third type teeth, one fourth type tooth, and multiple first type teeth that are sequentially arranged; (c) each tooth group includes multiple third type teeth, one fourth type tooth, multiple first type teeth, and one second type tooth that are sequentially arranged; (d) each tooth group includes one fourth type tooth, multiple first type teeth, one second type tooth, and multiple third type teeth that are sequentially arranged, wherein the number of the first type teeth is the same as the number of the third type teeth.

Preferably, at step S1, each tooth is formed with a tooth body extending from the connecting portion, each tooth tip extends from a distal end of the tooth body to two sides thereof, and a sum of lengths of adjacent tooth tips of adjacent teeth is equal to or slightly less than a distance between the tooth bodies of the adjacent teeth.

In embodiments of the present invention, the core laminations of the magnetic core are formed from an elongated sheet material, which reduces the material wastage. In the axial direction of the core, the long tooth tip and short tooth tip overlap with each other, thus reducing the width of the winding slot opening.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
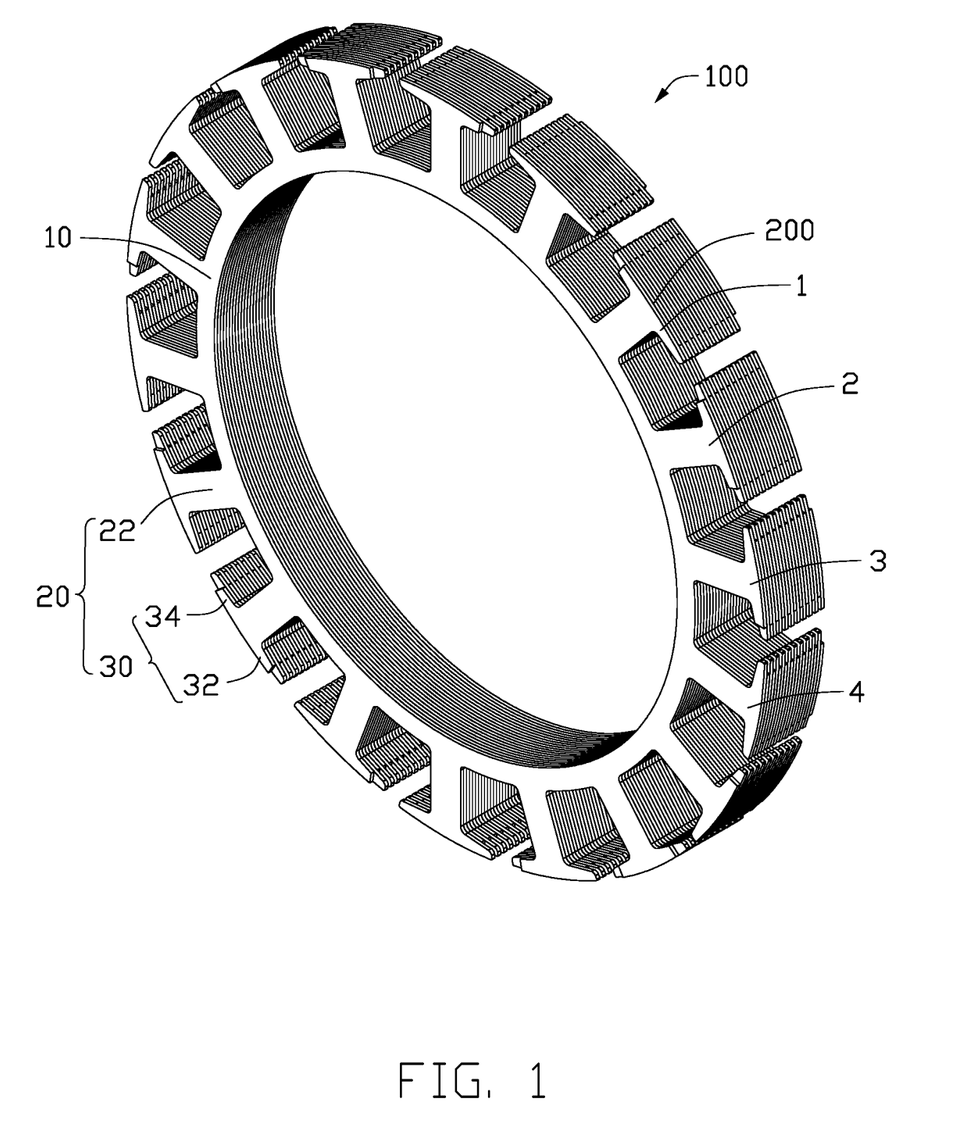
FIG. 1 illustrates a core for an electric motor according one embodiment of the present invention.
Figure 2:
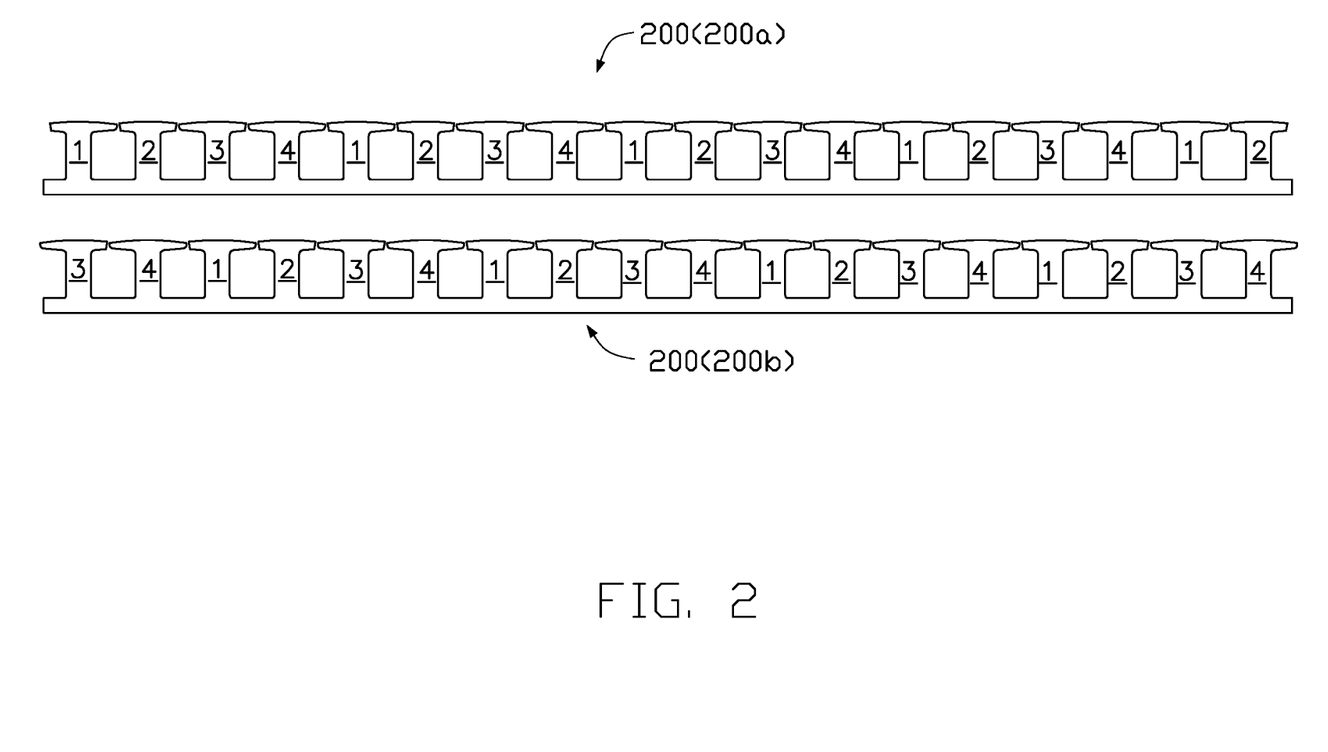
FIG. 2 is an unrolled view of two adjacent core laminations of the core of FIG. 1.

Referring to FIG. 1 and FIG. 2, one embodiment of the present invention provides a magnetic core 100 for an electric motor, which includes a ring-shaped yoke 10, teeth 20 extending outwardly from the yoke 10, and tooth tips 30 extending from distal ends of tooth body 22 of the teeth 20 in a circumferential direction. The tooth tip 30 of each tooth 20 includes a left half tooth tip 32 and a right half tooth tip 34. The length of the left half tooth tip 32 and the right half tooth tip 34 are measured in the circumferential direction of the yoke 10. The magnetic core 100 is made by stacking a plurality of core laminations 200 (FIG. 2). The magnetic core 100 is made from a magnetically-conductive material and is preferably an iron core. Each lamination forming a lamination layer of the core.

Figure 3:
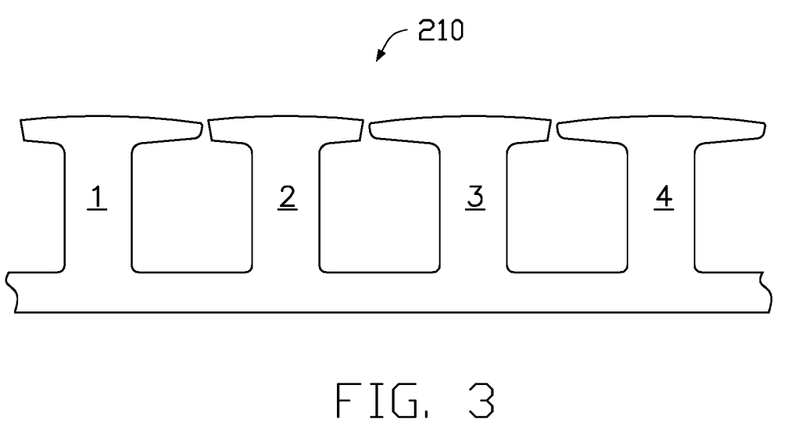
FIG. 3 illustrates a tooth group of the core of FIG. 2.

Referring to FIG. 2 and FIG. 3, a first lamination layer 200a in FIG. 2 is formed by cutting off a second half of the last tooth group from sequentially arranged five tooth groups 210. A second lamination layer 200b in FIG. 2 is formed by cutting off a first half of the first tooth group from sequentially arranged five tooth groups 210. In alternative embodiments, each lamination layer may have more or less tooth groups.

As shown in FIG. 3, each tooth group 210 includes four sequentially arranged teeth including a first type tooth 1, a second type tooth 2, a third type tooth 3, and a fourth type tooth 4. The left half tooth tip of the first type tooth 1 is a short tooth tip, and the right half tooth tip is a long tooth tip. The left and right half tooth tips of the second type tooth 2 are both short tooth tips. The left half tooth tip of the third type tooth 3 is a long tooth tip, and the right half tooth tip is a short tooth tip. The left and right half tooth tips of the fourth type tooth 4 are both long tooth tips. Specifically, the first type tooth 1, the second type tooth 2, the third type tooth 3 and the fourth type tooth 4 satisfy the following conditions: (a) the length of the left half tooth tip of the first type tooth 1 is less than the length of the left half tooth tip of the third type tooth 3, the length of the right half tooth tip of the first type tooth 1 is greater than the length of the right half tooth tip of the third type tooth 3, the length of the left half tooth tip of the second type tooth 2 is less than the length of the left half tooth tip of the fourth type tooth 4, and the length of the right half tooth tip of the second type tooth 2 is less than the length of the right half tooth tip of the fourth type tooth 4.

In a first alternative embodiment, the second type tooth 2, the third type tooth 3, the fourth type tooth 4 and the first type tooth 1 are sequentially arranged into a tooth group.

In a second alternative embodiment, the third type tooth 3, the fourth type tooth 4, the first type tooth 1 and the second type tooth 2 are sequentially arranged into a tooth group.

In a third alternative embodiment, the fourth type tooth 4, the first type tooth 1, the second type tooth 2 and the third type tooth 3 are sequentially arranged into a tooth group.

Such structural arrangements can increase the material utilization rate. As shown in FIG. 2, when the core lamination is punched from a sheet material, a large portion of the material can be used as the lamination, which reduces material wastage. In addition, when viewed from left to the right in FIG. 2, after two adjacent lamination layers are stacked, the shorter left half tooth tip of the first type tooth 1 of the upper lamination layer 200a overlaps with the longer left half tooth tip of the third type tooth of the lower lamination layer 200b, the longer right half tooth tip of the first type tooth 1 of the upper lamination layer 200a overlaps with the shorter right half tooth tip of the third type tooth of the lower lamination layer 200b, thereby increasing the effective length of the left half tooth tip and right half tooth tip of each tooth of the stator core, which can minimize the width of the opening of the winding slot and hence improve the motor performance.

In the description and claims, "overlap" refers to the overlapping of projections in a certain direction. For example, the overlapping of the first type tooth 1 of the upper lamination layer 200a and the third type tooth 3 of the lower lamination layer 200b refers to the overlapping of the projections of the first type tooth 1 and the third type tooth 3 in the motor axial direction. The upper lamination layer 200a and the lower lamination layer 200b may be two adjacent core laminations, and also may be two core laminations that are not adjacent to each other.

As shown in FIG. 2, the relationship between the first type tooth 1, the second type tooth 2, the third type tooth 3, and the fourth type tooth 4, preferably, satisfies the following conditions: a sum of the lengths of adjacent tooth tips of adjacent teeth is close to (equal to or slightly less than) a distance between tooth bodies of adjacent teeth. In particular, a sum of the length of the right half tooth tip of the first type tooth 1 and the length of the left half tooth tip of the second type tooth 2, a sum of the length of the right half tooth tip of the second type tooth 2 and the length of the left half tooth tip of the third type tooth 3, a sum of the length of the right half tooth tip of the third type tooth 3 and the length of the left half tooth tip of the fourth type tooth tip 4, and a sum of the length of the right half tooth tip of the fourth type tooth 4 and the length of the left half tooth tip of the first type tooth tip 1 are substantially the same and each equal to or slightly less than a distance between tooth bodies (i.e. the part between the yoke and tooth tip) of two adjacent teeth. The gap between adjacent tooth tips should be as small as possible to save as much material as possible.

The stator core of FIG. 1 can be made by two preferred methods. In a first method, each lamination layer of the stator core is formed by bending an individual sheet material. In particular, the method for making the stator core includes the following steps.

Referring to FIG. 2, at step S1, an elongated sheet material is punched. At this time, the sheet material is flat and straight, which includes a connecting portion and a plurality of teeth extending from the connecting portion. The teeth are sequentially arranged in the order of the first type tooth 1, the second type tooth 2, the third type tooth 3 and the fourth type tooth 4. Each tooth includes a tooth body extending from the connecting portion and a tooth tip extending from a distal end of the tooth body to two sides of the tooth body. The tooth tip includes a left half tooth tip and a right half tooth tip. The length of the left half tooth tip and the right half tooth tip is measured in the circumferential direction of the core.

In order to save material and ensure that the slot opening of the winding slot is as small as possible after the core laminations are stacked, the gap between adjacent tooth tips should be as small as possible when in the strip form (before bending). Preferably, the sum of the length of the right half tooth tip of the first type tooth and the length of the left half tooth tip of the second type tooth is substantially the same as the distance between the first type tooth and the second type tooth. The sum of the length of the right half tooth tip of the second type tooth and the length of the left half tooth tip of the third type tooth is substantially the same as the distance between the second type tooth and the third type tooth. The sum of the length of the right half tooth tip of the third type tooth and the length of the left half tooth tip of the fourth type tooth tip is substantially the same as the distance between the third type tooth and the first type tooth. The sum of the length of the right half tooth tip of the fourth type tooth and the length of the left half tooth tip of the first type tooth tip is substantially the same as the distance between the fourth type tooth and the first type tooth.

Each sheet material after being punched can be considered as being formed by cutting off a first half of the last tooth group from K+1 tooth groups that are sequentially arranged, where K is an integer greater than zero. Each tooth group includes a first type tooth 1, a second type tooth 2, a third type tooth 3, and a fourth type tooth 4. As can be seen from FIG. 2, cutting off a sheet material having 2k+1 tooth groups at a middle of the (k+1)th tooth group can result in a first type lamination 200a and a second type lamination 200b. Therefore, preferably, at step S1, the sheet material is first punched to have 2k+1 tooth groups, and the sheet material having 2k+1 tooth groups is cut off at the (k+1)th tooth group, thus obtaining a first type lamination and a second type lamination.

Figure 4:
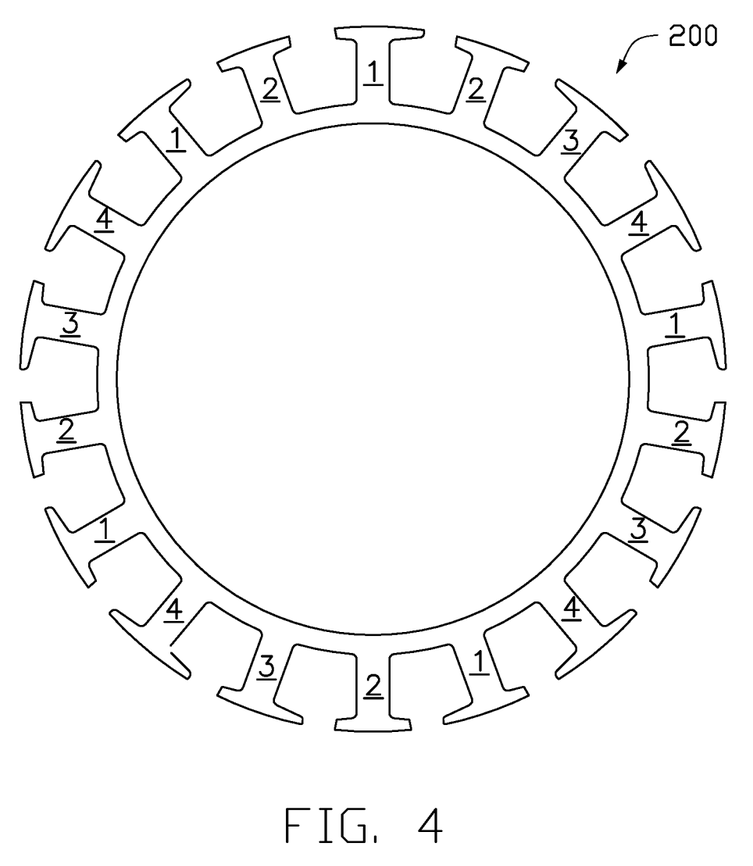
FIG. 4 and FIG. 5 illustrate two adjacent core laminations formed by bending the sheets of FIG. 2.
Figure 5:
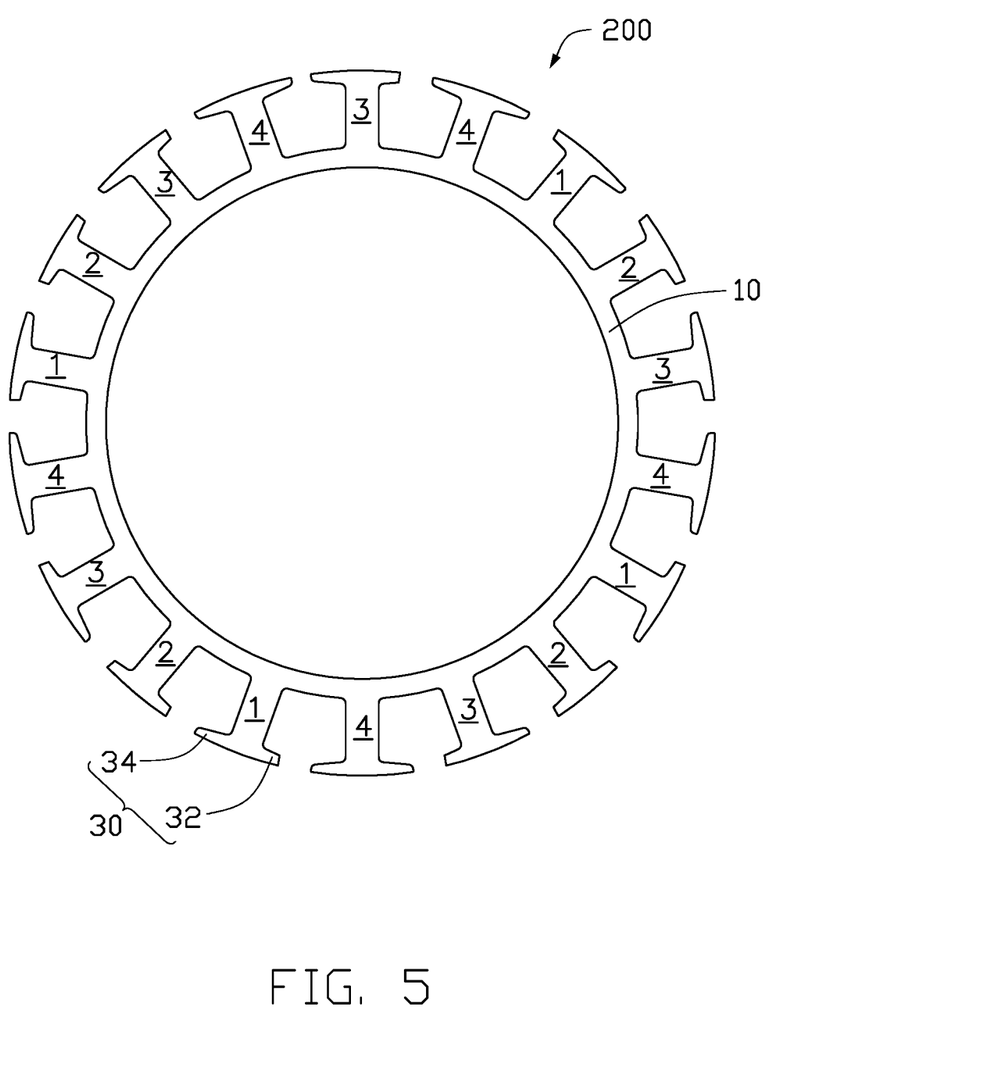

Referring to FIG. 4 and FIG. 5, at step S3, each sheet material is bent into a ring-shaped lamination, with the connecting portions of all sheet materials making the ring-shaped yoke and the teeth of each sheet material extending outwardly from the yoke to form the teeth of the core.

At step S4, multiple laminations that have been bent into the ring shape are stacked, with a starting end of a previous lamination overlapping a starting end of a later lamination, and a tail end of the previous layer overlapping a tail end of the later layer. The first type core lamination 200a and the second type core lamination 200b are alternately stacked, either individually or in groups of laminations of the same type.

In the method described above, the sheet material is first bent into the ring-shaped lamination at step S3 and multiple laminations are then stacked at step S4. In an alternative embodiment, multiple laminations are stacked to form multiple layers of laminations at step S3, and the stacked multiple layers of laminations are then bent into the ring shape at step S4, with the connecting portions of all sheet materials making the ring-shaped yoke, and the teeth of each lamination forming the core teeth extending outwardly from the yoke.

It should be understood that, in the above method, the number of the teeth included in the tooth group is an even number and, after stacking, the first type tooth, second type tooth, third type tooth and fourth type tooth of multiple layers of laminations overlap with the third type tooth, fourth type tooth, first type tooth, and second type tooth of other multiple layers.

Figure 6:
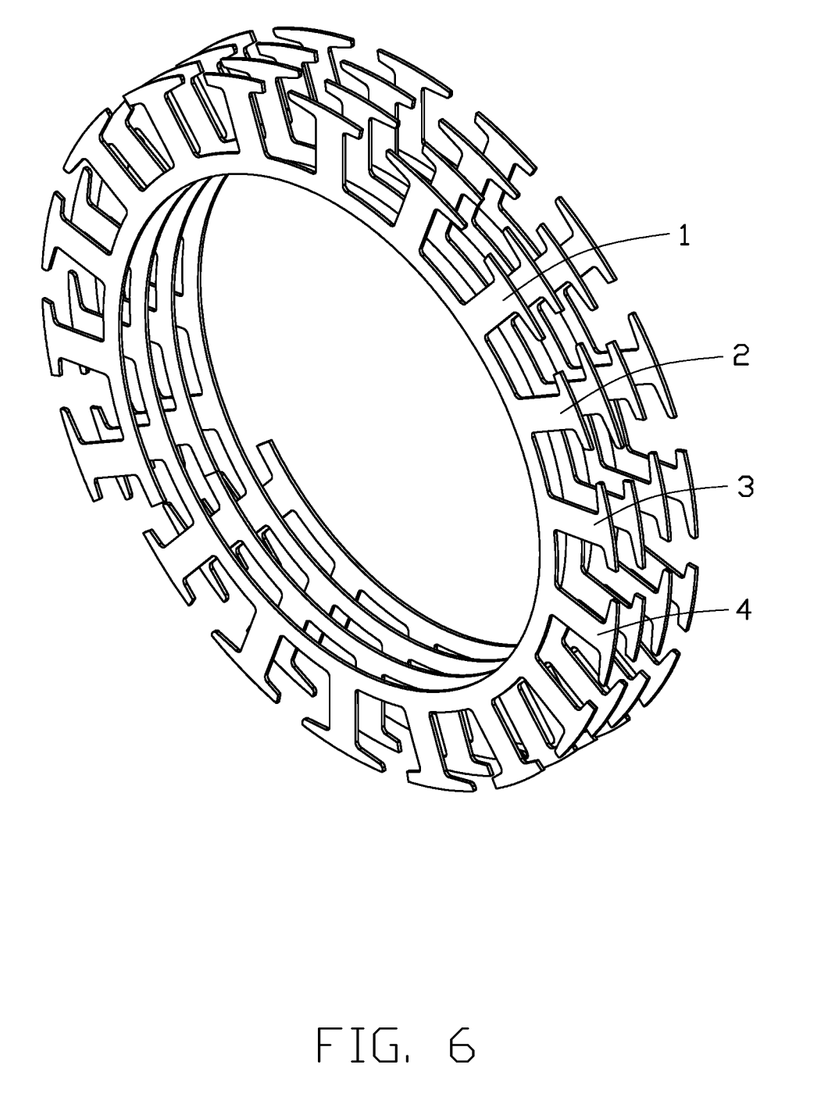
FIG. 6 illustrates a sheet material coiled to form a core according to another embodiment of the present invention.

Referring to FIG. 6, in a second method, the entire magnetic core 100 is made by rolling or coiling a strip of punched elongated sheet material, multiple turns in a circumferential direction, with each turn being equivalent to or forming a single lamination layer 200 of the magnetic core 100. In particular, the method includes the following steps.

First, an elongated sheet material is punched to have a connecting portion and multiple teeth extending from the connecting portion. Each tooth includes a tooth tip extending from a distal end of the tooth on opposite sides of the tooth. The tooth tip has a left half tooth tip and a right half tooth tip. The length of the left half tooth tip and the right half tooth tip is measured in the circumferential direction.

The sheet material after being punched forms a plurality of tooth groups.

Each tooth group including a first type tooth 1, a second type tooth 2, a third type tooth 3, and a fourth type tooth 4 that are sequentially arranged. In this embodiment, there are one first type tooth 1, one second type tooth 2, one third type tooth 3, and one fourth type tooth 4 in each tooth group. In another embodiment, the number of the first type teeth and the third type teeth may be more than one.

The sheet material after being punched is rolled or coiled to form multiple turns, with each turn forming one lamination layer of the motor magnetic core. Each lamination layer includes a ring-shaped yoke and teeth extending outward from the yoke. Each lamination layer includes k tooth groups and a half tooth group that are sequentially arranged. In this embodiment, each lamination layer includes 4k+2 teeth. In this method, the last two teeth of a previous lamination layer and the first two teeth of a later lamination layer form one tooth group and, the first type tooth, the second type tooth, the third type tooth and the fourth type tooth of the previous lamination layer overlap with the third type tooth, the fourth type tooth, the first type tooth, and the second type tooth of the later lamination layer.

The magnetic core of the present invention may be used as a stator core or a rotor core of the motor.

Understandably, the term "ring shape" as used in this application not only includes the traditional annular/circular ring shape, but it also includes other shapes such as square or polygonal shape.

Understandably, the present invention may be embodied with each lamination layer having S teeth, wherein multiple first type teeth, one second type tooth, multiple third type teeth and one fourth type tooth that are sequentially arranged to form one tooth group, and each tooth group has T teeth, with S and T satisfying the following relation: $S/T=N+$ remainder, where N is a positive integer, T is an even number and remainder=T/2. That is, $S/T=N+\frac{1}{2}$ or $S=N\cdot T+T/2$. Thus the lamination may be formed with an even or odd number of teeth S. Prior to bending the sheet material into the ring shape, the sum of adjacent tooth tips of adjacent teeth is close to (equal to or slightly less than) the distance between tooth bodies of the adjacent teeth.

Figure 7:
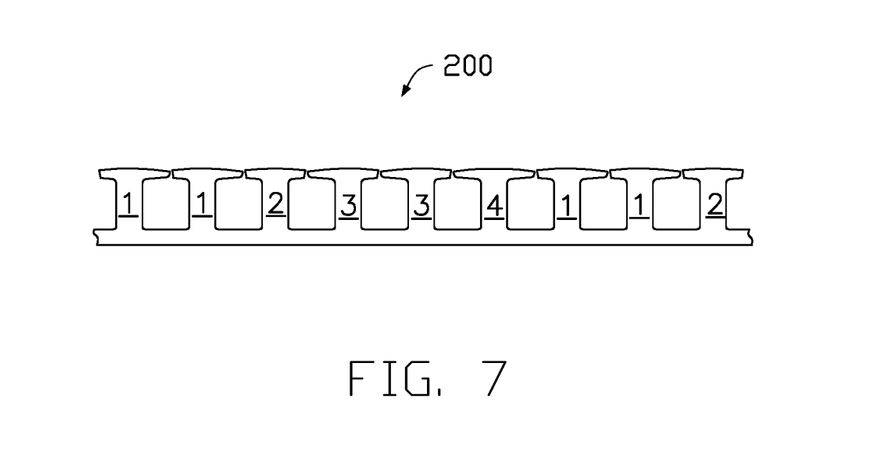
FIG. 7 illustrates an unrolled portion of a core lamination according to another embodiment of the present invention.

Referring to FIG. 7, each tooth group has two first type teeth, one second type tooth, two third type teeth, and one fourth type tooth. As such, each tooth group has six teeth, and the number of the teeth of each lamination layer may be an odd number such as 9, 15 or 21.

Figure 8:
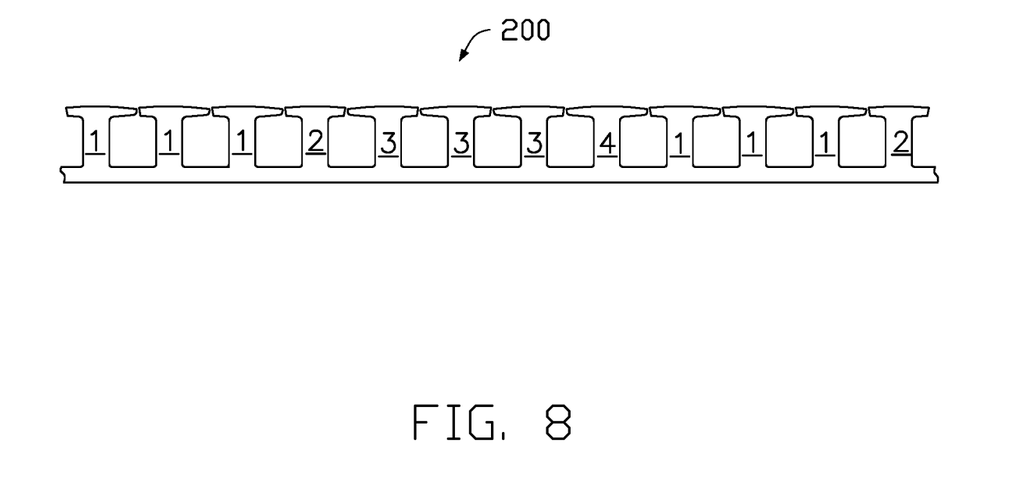
FIG. 8 illustrates an unrolled portion of a core lamination according to still another embodiment of the present invention.

Referring to FIG. 8, each tooth group has three first type teeth, one second type tooth, three third type teeth, and one fourth type tooth. As such, each tooth group has eight teeth, and the number of the teeth of each lamination layer may be an even number such as 12, 20 or 28.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A method for making a magnetic core for an electric motor, comprising the following steps:

step S1: forming a plurality of elongated sheet materials by punching, with each sheet material including a connecting portion and a plurality of teeth extending from the connecting portion, each tooth including a tooth tip extending from a distal end of the tooth to two sides thereof, the tooth tip including a left half tooth tip and a right half tooth tip; each sheet material including a plurality of groups each having a first type tooth, a second type tooth, a third type tooth and a fourth type tooth that are sequentially arranged, the left half tooth tip of the first type tooth being a short tooth tip, the right half tooth tip of the first type tooth being a long tooth tip, the left and right half tooth tips of the second type tooth are both short tooth tips, the left half tooth tip of the third type tooth being another long tooth tip, the right half tooth tip of the third type tooth being another short tooth tip, the left and right half tooth tips of the fourth type tooth being both long tooth tips;

step S3: bending each sheet material into a ring-shaped core lamination, with the connecting portions of all sheet materials making a ring-shaped yoke and the teeth of each sheet material extending outwardly from the yoke; and     step S4: stacking multiple layers of ring-shaped core laminations, with the first type tooth of at least one lamination layer overlapping with the third type tooth of another lamination layer, the second type tooth of the at least one lamination layer overlapping with the fourth type tooth of the another lamination layer, the third type tooth of the at least one lamination layer overlapping with the first type tooth of the another lamination layer, and the fourth type tooth of the at least one lamination layer overlapping with the second type tooth of the another lamination layer.

2. The method of claim 1, wherein:

at step S1, each lamination layer after being punched has S teeth, wherein multiple first type teeth, one second type tooth, multiple third type teeth and one fourth type tooth that are sequentially arranged to form one tooth group, and each tooth group has T teeth, with S and T satisfying the following relation: $S/T=N+\frac{1}{2}$, where N is a positive integer and T is an even number; and     at step S3, the first type tooth, second type tooth, third type tooth and fourth type tooth of a first type sheet material overlap with the third type tooth, fourth type tooth, first type tooth and second type tooth of a second type sheet material, respectively.

3. The method of claim 2, wherein at step S3, the first type sheet material and the second type sheet material are alternately arranged.

4. The method of claim 2, wherein at step S1, the sheet material is first punched to have 2k+1 tooth groups, and the sheet material having 2k+1 tooth groups is cut at the (k+1)th tooth group, thus obtaining the first type sheet material and the second type sheet material.

5. The method of claim 2, wherein at step S1, each of the tooth group satisfies one of the following conditions:

(a) each of the tooth group includes multiple the first type teeth, one the second type tooth, multiple the third type teeth, and one the fourth type tooth that are sequentially arranged, wherein the number of the first type teeth is the same as the number of the third type teeth;

(b) each of the tooth group includes one the second type tooth, multiple the third type teeth, one the fourth type tooth, and multiple the first type teeth that are sequentially arranged, wherein the number of the first type teeth is the same as the number of the third type teeth;

(c) each of the tooth group includes multiple the third type teeth, one the fourth type tooth, multiple the first type teeth, and one the second type tooth that are sequentially arranged, wherein the number of the first type teeth is the same as the number of the third type teeth;

(d) each of the tooth group includes one the fourth type tooth, multiple the first type teeth, one the second type tooth, and multiple the third type teeth that are sequentially arranged, wherein the number of the first type teeth is the same as the number of the third type teeth.

6. A method for making a magnetic core for an electric motor, comprising the following steps:

step S1: forming an elongated sheet material by punching, with the sheet material including a connecting portion and a plurality of teeth extending from the connecting portion, each tooth including a tooth tip extending from a distal end of the tooth to two sides thereof, the tooth tip including a left half tooth tip and a right half tooth tip; the sheet material including a plurality of groups of teeth each having a first type tooth, a second type tooth, a third type tooth and a fourth type tooth that are sequentially arranged, the left half tooth tip of the first type tooth being a short tooth tip, the right half tooth tip of the first type tooth being a long tooth tip, the left and right half tooth tips of the second type tooth are both short tooth tips, the left half tooth tip of the third type tooth being another long tooth tip, the right half tooth tip of the third type tooth being another short tooth tip, the left and right half tooth tips of the fourth type tooth being both long tooth tips; and step S2: spirally rolling the sheet material multiple turns, with each turn forming a lamination layer of the magnetic core, each lamination layer including a ring-shaped yoke and the teeth extending from the yoke; with the first type tooth of at least one lamination layer overlapping with the third type tooth of another lamination layer, the second type tooth of the at least one lamination layer overlapping with the fourth type tooth of the another lamination layer, the third type tooth of the at least one lamination layer overlapping with the first type tooth of the another lamination layer, and the fourth type tooth of the at least one lamination layer overlapping with the second type tooth of the another lamination layer.

7. The method of claim 6, wherein at step S2, each lamination layer has S teeth, wherein the first type tooth, second type tooth, third type tooth and fourth type tooth form one tooth group, and each tooth group has T teeth, with S and T satisfying the following relationship: $S/T=N+\frac{1}{2}$, where N is a positive integer and T is an even number; the last T/2 teeth of a previous lamination layer and the first T/2 teeth of a later lamination layer form one tooth group.

8. The method of claim 7, wherein at step S2, each of the tooth group satisfies one of the following conditions:

(a) each of the tooth group includes multiple the first type teeth, one the second type tooth, multiple the third type teeth, and one the fourth type tooth that are sequentially arranged;

(b) each of the tooth group includes one the second type tooth, multiple the third type teeth, one the fourth type tooth, and multiple the first type teeth that are sequentially arranged;

(c) each of the tooth group includes multiple the third type teeth, one the fourth type tooth, multiple the first type teeth, and one the second type tooth that are sequentially arranged;

(d) each of the tooth group includes one the fourth type tooth, multiple the first type teeth, one second the type tooth, and multiple the third type teeth that are sequentially arranged, wherein the number of the first type teeth is the same as the number of the third type teeth.

9. The method of claim 7, wherein at step S1, each tooth is formed with a tooth body extending from the connecting portion, each tooth tip extends from a distal end of the tooth body to two sides thereof, and a sum of lengths of adjacent tooth tips of adjacent teeth is equal to or slightly less than a distance between the tooth bodies of the adjacent teeth.

10. A method for making a magnetic core for an electric motor, comprising the following steps:

step S1: forming a plurality of elongated sheet materials by punching, with each sheet material including a connecting portion and a plurality of teeth extending from the connecting portion, each tooth including a tooth tip extending from a distal end of the tooth to two sides thereof, the tooth tip including a left half tooth tip and a right half tooth tip; each sheet material including a plurality of groups of teeth each having a first type tooth, a second type tooth, a third type tooth and a fourth type tooth that are sequentially arranged, the left half tooth tip of the first type tooth being a short tooth tip, the right half tooth tip of the first type tooth being a long tooth tip, the left and right half tooth tips of the second type tooth are both short tooth tips, the left half tooth tip of the third type tooth being another long tooth tip, the right half tooth tip of the third type tooth being another short tooth tip, the left and right half tooth tips of the fourth type tooth being both long tooth tips;

step S2: stacking multiple sheet materials to form multiple layers of core laminations, with the first type tooth of at least one lamination layer overlapping with the third type tooth of another lamination layer, the second type tooth of the at least one lamination layer overlapping with the fourth type tooth of the another lamination layer, the third type tooth of the at least one lamination layer overlapping with the first type tooth of the another lamination layer, and the fourth type tooth of the at least one lamination layer overlapping with the second type tooth of the another lamination layer; and step S3: bending the stacked multiple layers of core laminations into a ring shape, with the connecting portions of all sheet materials making a ring-shaped yoke, and the teeth of each sheet material extending outwardly from the yoke.

* * * * *